United States Patent [19]

Agnello

[11] Patent Number: 4,464,784

[45] Date of Patent: Aug. 7, 1984

[54] PITCH CHANGER WITH GLITCH MINIMIZER

[75] Inventor: Anthony M. Agnello, Brooklyn, N.Y.

[73] Assignee: Eventide Clockworks, Inc., New York, N.Y.

[21] Appl. No.: 259,092

[22] Filed: Apr. 30, 1981

[51] Int. Cl.$^{3}$ .......................... G10L 1/00; H04B 1/66; G11B 5/02

[52] U.S. Cl. ........................................ 381/61; 381/34; 381/36

[58] Field of Search ........................ 381/31, 32, 34, 36, 381/40, 49, 54, 61

[56] References Cited

U.S. PATENT DOCUMENTS

| | | | |
|---|---|---|---|
| Re. 31,172 | 3/1983 | Nishimura et al. | 381/32 |
| 3,369,077 | 2/1968 | French et al. | 381/38 |
| 3,621,150 | 11/1971 | Pappas | 381/54 X |
| 3,662,115 | 5/1972 | Saito et al. | 381/40 |
| 3,681,756 | 8/1972 | Burkhard et al. | 381/36 |
| 3,965,298 | 6/1976 | Carlson | 381/54 |
| 4,121,058 | 10/1978 | Jusko et al. | 381/32 |
| 4,228,322 | 10/1980 | Bringol et al. | 381/34 |
| 4,369,336 | 1/1983 | Agnello | 381/61 |

*Primary Examiner*—Felix D. Gruber

[57] ABSTRACT

A pitch changer with glitch minimizer is disclosed. The pitch changer changes the pitch of an input audio signal to a higher or lower level as desired. When performing such a pitch changing operation, certain portions of the input signal must be either repeated or deleted in the audio output signal. Such an operation makes it necessary to splice together two sub-segments of the audio input signal at various times throughout the operation of the pitch changer. The present invention minimizes glitches which would otherwise result in the audio output signal by determining the most desirable splice point in a predetermined range of splice points and causing the splice to occur at that point.

17 Claims, 14 Drawing Figures

PITCH CHANGER WITH GLITCH MINIMIZER

BACKGROUND OF THE INVENTION

The present invention is directed towards an improved pitch changer and more particularly to a pitch changer which minimizes the occurrance of "clicks" or "glitches" in the audio output signal derived by the pitch changer. Devices of this general type are generally known as "multiplicative pitch (or frequency) shifter devices", characterized by the fact that any input signal is multiplied in frequency by an amount determined by the user, typically over a continuously variable range between 0.25 and 4.0 corresponding to shifts of −2 to +2 octaves. Such devices are capable of accepting a baseband audio signal, typically from 20 Hz to 20 kHz, regardless of the complexity of the signal (i.e., the number of simultaneously present frequency components), and performing the pitch changing operation.

Devices of this type normally use digital techniques to achieve the desired pitch change. The audio input signal is read into a random access memory at a fixed rate and read out of the memory at an increased or decreased rate so as to increase or decrease the pitch, respectively. Because the variable rate readout takes the samples from the memory at a different rate than the samples are read into the memory, both the pitch (frequency) and time duration (phase) of the audio input signal will be varied. Since the time of duration of the audio output signal generated by the pitch change is different from that of the input signal, some means must be provided to effectively increase the duration of the output signal when the pitch changer is increasing the frequency of the input signal and for decreasing the time duration of the output signal when a pitch changer is decreasing the frequency of the input signal.

Normally this is done by either deleting or repeating segments of the digitized audio input signal stored in the pitch changer memory. For example, if the pitch ratio is increased, the memory of the frequency changer will "run out" of samples to be transmitted before the desired time duration of the tone is completed. For this reason, the pitch changer normally returns to the beginning of the signal segment stored in the pitch changer memory and appends the samples corresponding to this segment to the output data stream (at the new, higher sampling rate), until such time as new input samples become available. For a decrease in pitch ratio, samples are discarded instead of repeated. In either case, one portion of the sample segment stored in the pitch changer memory is effectively spliced to another non-contiguous portion thereof.

The primary problem with pitch changers of the foregoing type is that the splice between signal segments is normally audible and usually objectionable. This splice can sound like periodic "clicks" of varying amplitude or phase, or various obvious, but readily discernable, "glitches" in the output signal. To remedy this problem, the prior art has suggested three basic schemes: (1) timing the splice so that it occurs on signal zero crossings or in zero crossings in the same direction; (2) smoothing the splice by slowly overlaying two segments; or (3) filtering out the spurious frequency components generated by the splice. All of these methods are less than optimal since there is little or no attempt to match the splice to the actual signal characteristics and select the best possible splicing point. The primary object of the present invention is to select a splicing point which will produce the least number of "clicks" or "glitches" in the audio output and to use this splicing point whenever stored sample signals must be deleted or repeated.

BRIEF DESCRIPTION OF THE INVENTION

In order to achieve the foregoing results, the present invention compares two successive signal segments of the input signal being pitch changed, and determines how far the signal segments should be shifted with respect to one another in order to obtain the least number of glitches in the audio output. To this end, the present invention performs an autocorrelation function on two time displaced segments of the stored signal and determines the best splicing point between these two signal segments as a function thereof.

Mathematically, a correlation function describes the similarity or disimilarity between two sets of data. The correlation of random data with other random data would yield a "correlation coefficient" of nearly zero. If the data sets are identical, the coefficient would be one. If the data is identical numerically but different in sign (e.g. each positive datum having an identical but negative associated datum), the coefficient would be minus one. An "auto correlation" function is similar except that a single set as compared with itself over a period of time. Obviously, if the entire data set is compared with itself, the correlation coefficient will always be one. However, if one subset of datum in the set is compared with a previous subset of datum in the same set, correlation may vary anywhere between plus and minus one. If the data is truly random, a coefficient of zero would be expected. If the data changes very slowly from point to point, the coefficients would be expected to peak at zero offset (i.e., comparison of the same subset), and decrease slowly on either side (positive or negative offset). If the data is periodic in form (such as a sine wave or other periodic function), then the auto correlation function itself would be periodic. That is, phase shifts which would cause the two subsets to move in and out of phase would cause the auto correlation function to vary in a periodic manner.

In the present invention, the auto correlation function of two contiguous signal segments of the same audio input signal is measured for all possible splicing points. The waveforms will usually be periodic and highly correlated. For example, a voice signal shows a very strong auto correlation function which is periodic with the time duration of each vocal cord excitation (typically 15 to 5 milliseconds). Adding or removing a signal segment (by splicing) with this exact length has minimum audible effect on the signal. Other audio signals show similar periodicities and splicing with regard to these can affect a significant improvement in the audible quality of the output signal.

BRIEF DESCRIPTION OF THE DRAWINGS

For the purpose of illustrating the invention, there is shown in the drawings an embodiment which is presently preferred, it being understood, however, that the invention is not limited to the precise arrangement and instrumentality shown.

FIG. 8 is a block diagram of the splice control circuit of FIG. 1.

DETAILED DESCRIPTION OF THE PREFERRED EMBODIMENT

Figure 1:
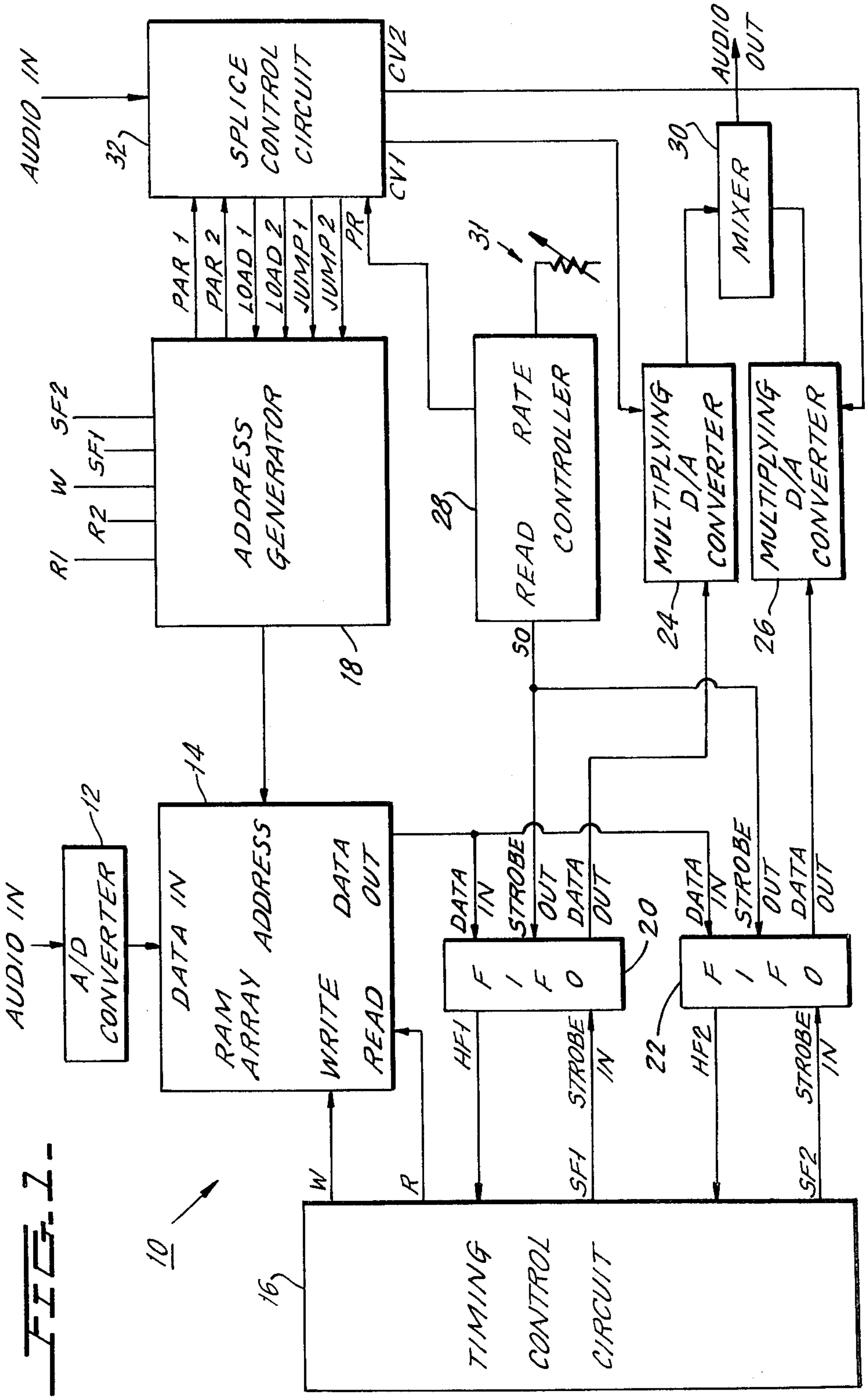
FIG. 1 is a block diagram of the pitch changer constructed in accordance with the principles of the present invention.

Referring now to the drawings wherein like numerals indicate like elements, there is shown in FIG. 1 a block diagram of a pitch modifying circuit constructed in accordance with the principles of the present invention and designated generally as 10.

Pitch modifying circuit 10 includes an A/D converter 12 which samples an analog audio input signal AUDIO IN at a sampling rate fc and applies the resultant sampled signals (in digital form) to the DATA IN input of RAM array 14. The sampling rate fc is preferably at least twice the frequency of the highest audio frequency to be recorded. By way of example, the sampling rate fc will be about 40 KHz for full band width audio signals and about 12 HKz for speech signals. For the purpose of the following description it will be assumed that a sampling rate of 40 KHz is used.

The sampled signals generated by A/D converter 12 are stored in sequentially decreasing address locations of RAM array 14 under the control of a timing control circuit 16 and an address generator 18. Timing control circuit 16 internally generates a clock signal C (see FIG. 2) having a frequency fc and defining a plurality of sampling intervals T. During each sampling interval T, timing control circuit 16 generates a single write pulse W which is applied to the WRITE input of RAM array 14. As a result, a new sampled signal is stored in RAM array 14 during each sampling interval. The storage location in which each sampled signal is stored is determined by address generator 18. In a manner described in greater detail with reference to FIG. 4 below, address generator 18 generates a base address signal which decreases by one during each consecutive sampling interval T. This signal determines the storage location of each consecutive sampled signal applied to the DATA IN input of RAM array 14. As a result, the first sample signal applied to RAM array 14 will be stored in the last storage location of RAM array 14, the second sample signal will be applied in the next to last storage location of RAM array 14, etc. This process is repeated until all of the storage locations of RAM array 14 are filled at which time the sampled signal stored in the last storage location of RAM array 14 will be replaced by the most recently sampled signal. While the preferred size of RAM array 14 may vary in accordance with the desired application, a 1024 bit array has been found to be suitable for most applications and will be presumed in the following description. Assuming a sampling frequency fc of 40 KHz, the array 14 will store a signal segment corresponding to the last 25 milliseconds of the sampled signal AUDIO IN.

The data stored in RAM array 14 is applied to a pair of first-in, first-out (FIFO) memories 20, 22 under the control of timing control circuit 16. FIFO memories 20, 22 are asynchronous memories which can be written into and read out of simultaneously. As such, FIFO memories 20, 22 operate as temporary storage buffers between RAM array 14 and multiplying D/A converters 24, 26, respectively. As will be shown below, each FIFO memory 20, 22 will store a plurality of sampled signals corresponding to a respective time delayed segment of the waveform stored in RAM array 14. For example, FIFO memory 20 will contain the sample segments corresponding to storage locations 206–216 of RAM array 14 while FIFO memory 22 will contain sample segments corresponding to storage locations 718–728 of RAM array 14. These signals are applied to respective D/A converters 24, 26 wherein they are converted to analog signals and combined in a Mixer 30 in a manner determined by splice control circuit 32.

The sampled signals stored in FIFO memories 20, 22 are removed from memories 20, 22 and applied to D/A converters 24, 26, respectively, under the control of a read rate controller 28. Read rate controller 28 generates a series of strobe pulses SO which are applied to the STROBE OUT inputs of FIFO memories 20, 22 as a continuous pulse trains. The frequency of the pulse train SO is preferably controlled by the setting of a potentiometer 31 whose position may be controlled by the operator of tone modifying circuit 10. This frequency, which may be greater than or less than the sampling frequency fc determined by the frequency of the write pulses W, determines the pitch change in the sampled signal. In the preferred embodiment, the frequency of pulse train 31 can be varied between 20 and 80 KHz, which corresponds to a pitch ratio of 0.5 and 2, respectively. Since the signal segments stored in FIFO memories 20, 22 are identical in shape to the shape of the input audio signal AUDIO IN but are applied to D/A converters 24, 26 at frequencies which vary from the sampling frequency fc at which sampled signals are generated by A/D converter 12, the outputs of the D/A converters 24, 26 will be analog signals which are substantially identical in shape to the audio input signal but frequency and phase shifted (time delayed) with respect thereto. For reasons which are described in some detail below, the signal segments stored in FIFO memories 20, 22 will be phase shifted with respect to one another by a time period corresponding to approximately one quarter to one-half the signal segment stored in RAM array 14 or 12.5 milliseconds.

While the frequency at which information is read out of FIFO memories 20, 22 is controlled by read rate controller 28, the frequency at which new information is transferred from RAM array 14 into FIFO memories 20, 22 is controlled by timing control circuit 16. Particularly, timing control circuit 16 will vary the rate in which information is transferred from RAM array 14 into FIFO memories 20, 22 in a manner which will maintain both FIFO memories approximately half-full. As a result, FIFO memories 20, 22 will each include a plurality of sequentially sampled signals corresponding to a respective segment of the audio input signal stored in RAM array 18.

To this end, each FIFO memory 20, 22 preferably includes a half-full output HF which indicates whether the contents of the FIFO memory is half-full. One commercially available device having such an output is sold by ADVANCED MICRO DEVICES under the product designation No. 2813. This device generates a binary "1" on its half-full output HF whenever it is less than half-full and generates a binary "0" on its half-full output whenever it is more than half-full. Timing control circuit 16 monitors the condition of the half-full outputs of FIFO memories 20, 22 and causes new information to be read into each FIFO memory as a function of the condition of these outputs.

Figure 2:
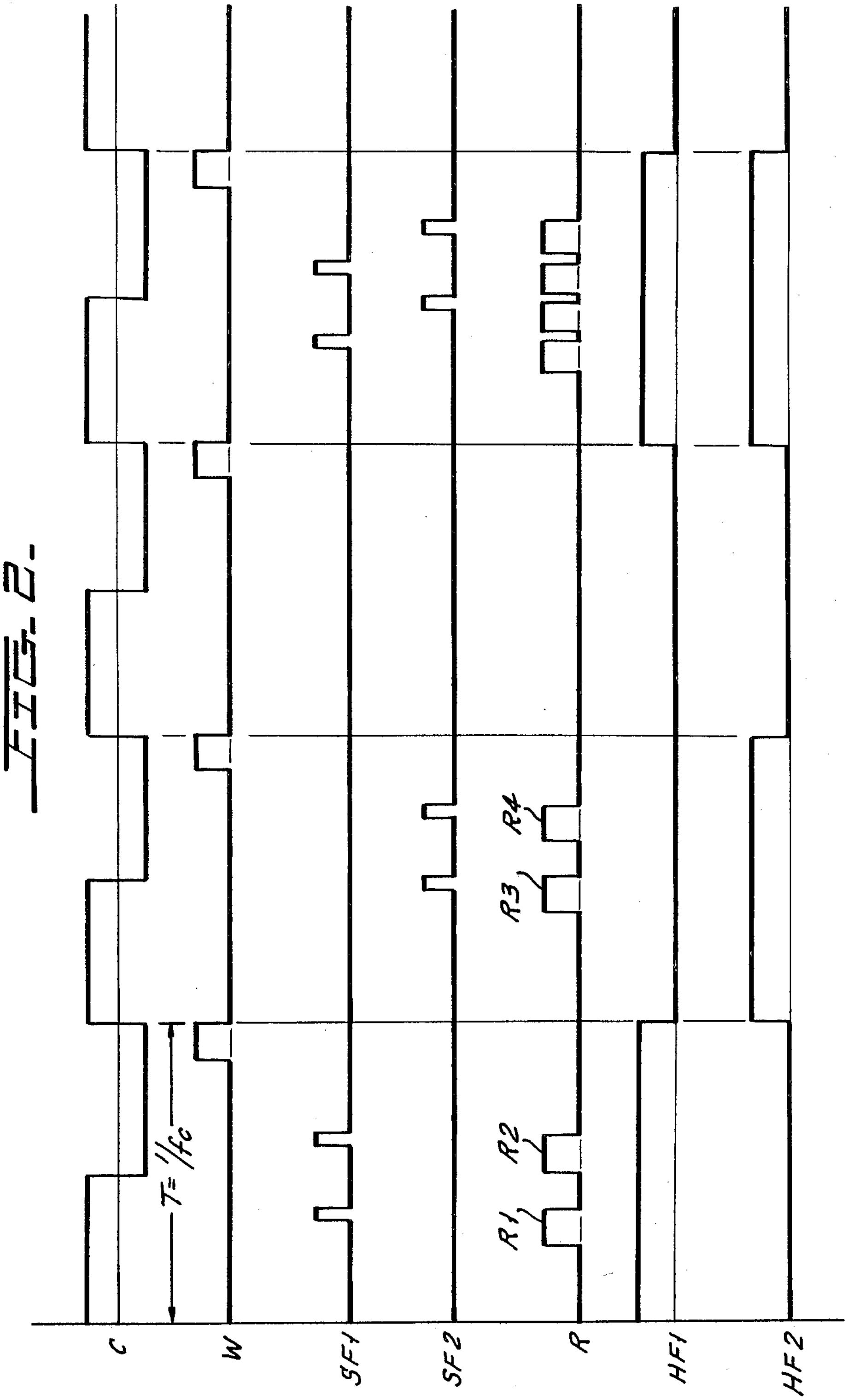
FIG. 2 is a timing diagram illustrating the timing of various signals appearing in the pitch changer of FIG. 1.

The interaction between FIFO memories 20, 22 and timing control circuit 16 may best be understood with reference to FIG. 2. In the example illustrated in FIG. 2, it is assumed that FIFO memory 20 is less than half-full and FIFO memory 22 is more than half-full during the first sampling interval T. As a result, only the half-full output HF1 of FIFO memory 20 is at the binary "1" level. This condition is detected by timing control circuit 16 which, in cooperation with the address generator 18, causes a pair of sampled signals located in successive storage locations of RAM array 14 to be applied to FIFO memory 20. To this end, timing control circuit 16 generates a pair of read pulses R and a pair of strobe pulses SF1 during the first sampling interval T. Each read pulse R is applied to the read input of RAM array 14 and causes a sampled signal stored in RAM array 14 to be applied to the DATA OUT output of the array 14. Each strobe pulse SF1 is applied to the strobe in input of FIFO memory 20 and causes the sampled signal appearing at the DATA OUT output of RAM array 14 to be written into the FIFO memory 20.

The sampled signals written into FIFO memory 20 must be applied to FIFO memory 20 in the same order that they were applied to RAM array 14. To this end, address generator 18 includes a pointer address register 62 (see FIG. 4) which cooperates with a base address register 50 to keep track of the storage location of the last sampled signal stored in FIFO memory 20. For example, if FIFO memory 20 contains 10 sampled signals corresponding to address locations 206–216 of RAM array 14, pointer address register 62 will store information indicating that the last sampled signal stored in FIFO memory 20 corresponds to address location 206 of RAM array 14 and address generator 18 will sequentially apply addresses 205 and 204 to the ADDRESS input of RAM array 14 during the first sampling interval T at instants corresponding to the duration of the read signals R1, R2 (see FIG. 2). As a result, the sampled signals located in address locations 205 and 204 of RAM array 14 will be sequentially written into FIFO memory 20 during the sampling interval T.

Again referring to FIG. 2, it is assumed that FIFO memory 20 is more than half-full and that FIFO memory 22 is less than half-full during the second sampling interval T. As a result, only the half-full output HF2 of FIFO memory 20 is at the binary "1" level. This condition is detected by timing control circuit 16 which causes a pair of sampled signals located in successive storage locations in RAM array 14 to be applied to the FIFO memory 22. To this end, timing control circuit 16 again generates a pair of read pulses R and a pair of strobe pulses SF2 during the second sampling interval T. Each read pulse R is applied to the READ input of RAM array 14 and causes a sampled signal stored in the RAM array 14 to be applied to the DATA OUT output of array 14.

Since the sampled signals stored in FIFO memory 22 must be stored in memory 22 in the same sequence that they were applied to RAM array 14, address generator 18 also includes a pointer address register 64 which, together with the base address register 50, keeps track of the address location of the last sampled signal stored in FIFO memory 22. Assuming that FIFO memory 22 contains sampled signals corresponding to address locations 718–728 of RAM array 14, address generator 18 will generate address signals corresponding to the 716th and 717th address locations of RAM array 14 during the intervals in which the read signals R3 and R4, respectively, are generated. As a result, the sampled signals located in the 224th and 223rd storage locations of RAM array 14 will be written into FIFO memory 22.

In the example illustrated, it is assumed that both FIFO memories 20, 22 are more than half-full during the third sampling interval T. As a result, the half-full outputs HF1 and HF2 of memories 20, 22 will both be at the binary "0" level and timing control circuit 16 will not generate any read or strobe pulses. Accordingly, no additional information will be written into FIFO memories 20, 22 during this sampling interval.

Finally, in the fourth sampling interval T, it is assumed that both FIFO memories 20, 22 are less than half-full. As a result, timing control circuit 16 generates four successive read pulses R and the corresponding strobe pulses SF1, SF2 during the fourth sampling interval. Concurrently, address generator 18 generates the appropriate address signals to assure that the proper sampled signals are written to the FIFO memories 20, 22.

As shown in FIG. 2, the sampled signals stored in RAM array 14 are always transferred to FIFO memories 20, 22 in pairs (i.e., two sampled signals are transferred into a given memory 20, 22 during each sampling interval in which a transfer takes place). The reason for this procedure is explained in connection with the discussion of address generator 18 below.

As made clear by the foregoing, timing control circuit 16 causes information to be transferred from RAM array 14 to FIFO memories 20, 22 as a function of the contents of these memories. Particularly, timing control circuit 16 will cause information to be transferred from RAM array 14 to the FIFO memories 20, 22 only when the particular memory is less than half-full. Since the number of sampled signals stored in FIFO memories 20, 22 is reduced at a rate determined by the strobe signal SO generated by read rate controller 28, it can be seen that the rate at which sample signals are transferred from RAM array 14 to FIFO memories 20, 22 is actually controlled by the frequency of the strobe signal SO.

As noted above, FIFO memories 20, 22 operate as asynchronous buffers temporarily storing data transferred between RAM array 14 and D/A converters 24, 26. At any given instant, the sampled signals stored in FIFO memories 20, 22 will correspond to different signal segments of the signal stored in RAM array 14. In each case, the signal segments stored in FIFO memories 20, 22 represents a delayed portion of the signal stored in RAM array 14. In a manner described in greater detail below, the signal segments stored in FIFO memories 20, 22 are preferably offset with respect to one another by a time delay corresponding to approximately one-quarter to one-half of the memory size of the RAM array 14 (e.g., 6.25, 12.5 milliseconds).

Assuming that read rate controller 28 generates the strobe signal SO at a reduced frequency fc−Δf, information will be written into FIFO memories 20, 22 at a slower rate than it is written into RAM array 14. As a result, signal segments stored in FIFO memories 20, 22 will each represent a respective continually delayed portion of the stored signal. As time goes on, the delay in one of the FIFO memories 20, 22 may become greater than the storage capacity of RAM array 14 (e.g., 25 milliseconds) and the information in that FIFO memory will "fold over" or "wrap around" so that the sampled signal corresponding to the most delayed sample signal will be stored in the given FIFO memory adjacent the most recent sample signal stored in array 14. In contrast, if the strobe signals SO2 applied to FIFO memories 20, 22 are generated at an increased frequency fc+Δf, the signal segments stored in FIFO memories 20, 22 will represent a continuously decreased delay. At some point, the delay in one of the memories 20, 22 will become zero and the information in that FIFO memory will "fold over" so that a sampled signal corresponding to the most recent sample signal will be stored in the FIFO memory adjacent the most delayed sample signal stored in the array 14. This jump in signal segments represents a discontinuity in the signal stored in the FIFO memory and produces an audible "glitch" in the audio output signal.

In order to prevent the foregoing problems, the pitch changer 10 of the present invention places two different, time displaced signal segments in FIFO memories, 20, 22 and shifts control of the AUDIO OUT signal appearing at the output of mixer 30 between the two FIFO memories 20, 22 in such a manner that whenever the delay in either of the signal segments stored in memories 20, 22 approaches either a predetermined maximum value for pitch ratios less than 1 (decreasing pitch) or a predetermined minimum value for pitch ratios greater than 1 (increasing pitch) control over the audio output signal is switched to the other FIFO memory 20, 22. Since the signal segment whose delay has reached the maximum or minimum value is prevented from affecting the AUDIO OUT signal, the present invention precludes the occurrence of a "glitch" in the audio output.

Control over the AUDIO OUT signal is transferred between FIFO memories 20, 22 by adjusting the magnitude of two control signals CV1, CV2 generated by splice control 32. The signals are varied between predetermined maximum and minimum levels and control the respective operation of multiplying D/A converters 24, 26. Each multiplying D/A converter 24, 26 converts the digital signal applied to its input to an analog signal and multiplies this analog signal by a value determined by its respective signal CV1, CV2. When a respective control signal CV1, CV2 is at its maximum level, its multiplying D/A converter 24, 26 is full "ON" and generates an analog signal representative of the digital signal applied to its input. When the respective control signal CV1, CV2 is at its minimum level, its multiplying D/A converter 24, 26 is full "OFF" and generates no analog output signal. When the respective control signal CV1, CV2 is at a level between the maximum and minimum levels, its multiplying D/A converter 24, 26 generates an analog output signal whose wave shape is determined by the digital signal applied to its input but whose magnitude is reduced by a value determined by the magnitude of the control signal.

Control signals CV1, CV2 are generated by splice control circuit 32 in a manner to be described in more detail below. Splice control circuit 32 monitors the delay in the signal segments stored in FIFO memories 20, 22 and varies the operation of multiplying D/A converters 24, 26 as a function thereof. Under normal conditions, splice control circuit 32 maintains one of the multiplying D/A converters 24, 26 in an "ON" state and the remaining multiplying D/A converter 24, 26 in an "OFF" state. That multiplying D/A converter 24, 26 which is in the "ON" state converts the digital output of its respective FIFO memory 20, 22 to an analog signal and applies that analog signal to a mixer 30 whose output defines the AUDIO OUT signal. The multiplying D/A converter 24, 26 which is in the "OFF" state generates no analog signal at its output and does not affect the AUDIO OUT signal. As such, the FIFO memory 20, 22 whose output is coupled to the ON multiplying D/A converter controls the AUDIO OUT signal. This FIFO memory will be referred to as the "active" FIFO memory. The remaining FIFO memory will be referred to as "inactive" FIFO memory.

The splice control circuit 32 monitors the delay in the active FIFO memory 20, 22 and shifts control over the AUDIO OUT signal from the active to the inactive FIFO memory 20, 22 whenever the delay in the active memory reaches a predetermined minimum value for pitch ratios greater than 1 (increasing pitch) or predetermined maximum value for pitch ratios less than 1 (decreasing pitch). Since the delays of the signal segment stored in the FIFO memories 20, 22 are offset with respect to one another, an instantaneous transfer of control from one FIFO memory to the other would result in a "hard splice" which would be easily detected in the audio output. For this reason, splice control circuit 32 transfers control over the AUDIO OUT signal in a controlled manner by effectively gradually transferring the active FIFO memory to an inactive state and simultaneously transferring the active FIFO memory 20, 22 to the inactive state. This transfer is effectuated by varying the levels of control signals CV1, CV2 in the manner illustrated in FIG. 6. In this figure, it is presumed that the control signal CV1 is at the ON level and control signal CV2 is at the OFF level at time t0. In this condition, mixer 30 receives an input signal from multiplying D/A converter 24 only. As a result, the AUDIO OUT signal will be determined solely by the signal segment stored in FIFO memory 20.

At time t1, splice control circuit 32 determines that the delay in FIFO memory 20 has reached the predetermined minimum or maximum value (depending upon the pitch ratio of read rate controller 28) and begins shifting control over the AUDIO OUT signal from FIFO memory 20 to FIFO memory 22. This shift is carried out over the splicing period (t1 to t2) during which the control signal CV1 is ramped from the ON to the OFF state while the control signal CV2 is ramped from the OFF to the ON state. During the splice interval, the signal segments stored in FIFO memories 20, 22 are combined in mixer 30 and both contribute to the AUDIO OUT signal. This results in a "soft" splice of the two signals corresponding generally to the soft splice obtained when two pieces of tape are mechanically joined with a beveled splice. At the end of the splice period (at time t2), control signal CV1 is at the OFF level while control signal CV2 is at the ON level. At this time, only the output of multiplying D/A converter 26 is applied to mixer 30 and the AUDIO OUT signal is determined solely by the signal segment stored in FIFO memory 22. After a time interval determined by the pitch ratio of read rate controller 28 and the storage capacity of RAM array 14, the delay in FIFO memory 22 reaches the predetermined maximum or minimum levels for decreasing and increasing pitch ratios, respectively. At this time (time t3) splice control circuit 32 initiates another splicing interval during which control over the AUDIO OUT signal is gradually transferred from FIFO memory 22 to FIFO memory 20. At the end of the splice interval (time t4), only the output of multiplying D/A converter 24 is applied to mixer 30 and the AUDIO OUT is determined by the signal segment stored in FIFO memory 20 only. This process is continually repeated so as to avoid the glitches which would appear in the audio output if the active FIFO memory 20, 22 were permitted to wrap around.

As noted above, the signal segment stored in FIFO memories 20, 22 are time displaced from one another. As a result, the delay of the signal segment stored in one of the memories 20, 22 will be relatively large while that of the remaining memory will be relatively small. If the relative delay of the sample segments stored in the two FIFO memories 20, 22 is exactly one half the maximum delay (12.5 milliseconds) apart, a first segment of the AUDIO IN signal which is delayed with respect to a second segment of the AUDIO IN signal by 12.5 milliseconds would be spliced together during each splice interval. Such a time displacement is somewhat desirable since it insures that a splice interval will not occur too often. Such a "blind" splice may however, result in an undesirable variation or "flutter" in the volume of the audio output. This flutter results from the fact that the two time delayed signal segments which are combined in mixer 30 during the splicing intervals can be in phase, 180° out of phase, or somewhere in between. The frequency components of the signals which are in phase will be unaffected, those which are out of phase will cancel, and those which are partially out of phase will partially cancel with the net result being a momentary drop in the volume of the audio output. The severity of this volume reduction is dependent upon the degree to which the signals are out of phase. For this reason, the present invention periodically varies the time displacement between the two signal segments stored in FIFO memories 20, 22 in such a manner that when the two signal segments are spliced together, a minimum amount of cancellation will occur. Since cancellation will be minimized when the signals being combined in mixer 30 are in phase, the pitch changer 10 of the present invention periodically compares two consecutive signal segments of the AUDIO IN signal to determine what displacement between these two signals is necessary to have the signal segments most similar.

In the preferred embodiment, the present invention compares a 1st 6.25 millisecond signal segment with a 2nd consecutive 12.5 millisecond signal segment in an analog auto correlation signal generator to determine what delay between the two signal segments will cause the 1st signal segment to be most similar to any 6.25 millisecond signal segment of the second consecutive 12.5 millisecond signal segment. The auto correlation signal generator generates a digital auto correlation signal once every 12.5 milliseconds which output indicates the optimum delay between the two signal segments which will ensure a minimum degree of cancellation in mixer 30 during the splicing interval. This auto correlation signal is used to adjust the delay of the signal segment stored in the inactive FIFO memory 20, 22 to ensure that two signal segments of the signal stored in RAM array 14 which are most similar are combined in mixer 30 during each splicing interval.

Having explained the general operation of pitch modifying circuit 10, the specific structure and operation of timing control circuit 16, address generator 18 read controller 28 and splice control circuit 32 will now be described.

Figure 3:
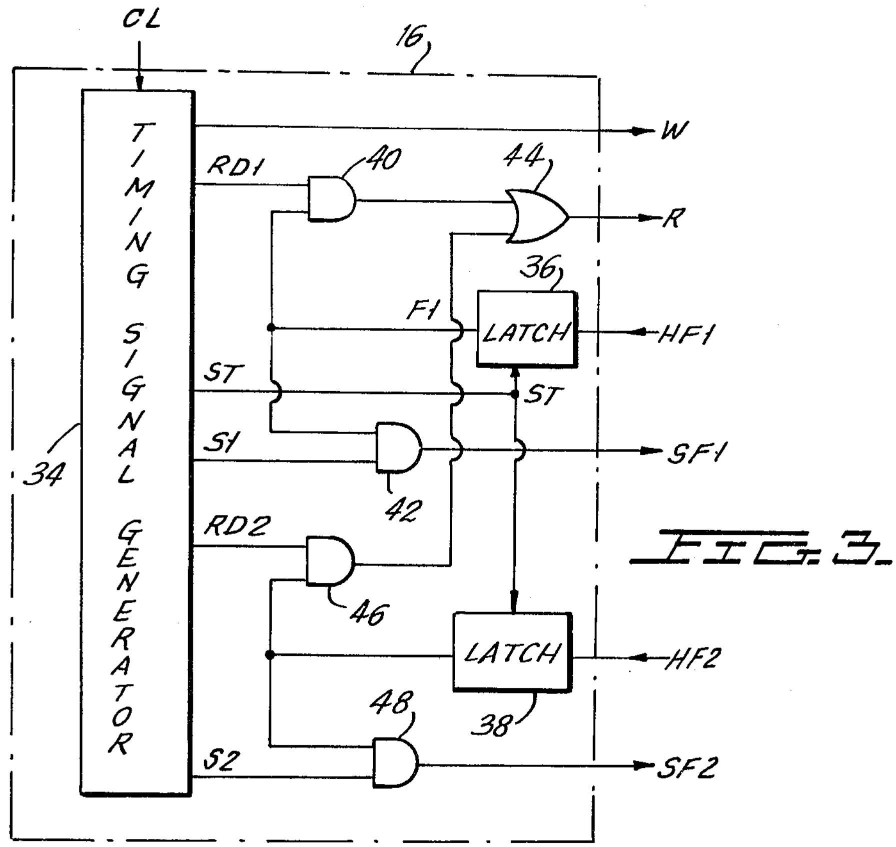
FIG. 3 is a block diagram of the timing control circuit of FIG. 1.

The preferred structure of timing control circuit 16 is illustrated in FIG. 3. As shown therein, timing control circuit 16 includes a timing signal generator 34 which generates basic timing signals W, RD1, Rd2, ST, S1 and S2 (see FIG. 5) responsive to a high frequency clock signal CL. The clock signal CL may be generated by a high-frequency oscillator (not shown) such as a 555 timer. Timing signal generator 34 may be a simple timing PROM or may be formed using appropriate counters and gates to insure the sequential generation of the timing pulses illustrated in FIG. 5. As shown therein, each sampling interval T is preferebly divided into eight equal segments Δt1–Δt8. The write signal W is generated during the last segment Δt8 of each sampling interval T. The read signals RD1 are generated during the segments Δt3 and Δt6 of each sampling interval T and define the time intervals during which sampled signals may be read out of RAM array 14 and applied to FIFO memory 20. The strobe pulses S1 are generated at the end of the segments Δt3 and Δt6 of each sampling interval T and define the strobe instants at which new information can be written in to FIFO memory 20. The read signals RD2 are generated during the segments Δt4 and Δt7 of each sampling interval and define the time intervals during which sampled signals may be read out of RAM array 14 and applied to the FIFO memory 22. The strobe signals S2 are generated at the end of segments Δt4 and Δt7 of each sampling interval and define the instants at which new information may be strobed into FIFO memory 22. Finally, the strobe signal St is generated during the first segment Δt1 of each sampling interval T and serves as a latch signal for latching the condition of the half-full output of FIFO memories 20, 22 at the beginning of each sampling interval.

As noted above, timing control circuit 16 causes sampled signals located in RAM array 14 to be applied to the FIFO memories 20, 22 only when the FIFO memory requests additional data. FIFO memories 20, 22 so request data when they generate a binary "1" on their half-full outputs. Timing control circuit 16 monitors the condition of the half-full outputs of FIFO memories 20, 22 and generates the read signal R and the strobe signals SF1 and SF2 accordingly. To this end, timing control circuit 16 includes a latch circuit 36 connected to the half-full output HF1 of FIFO memory 20 and a latch circuit 38 connected to the half-full output HF2 of FIFO memory 22. The condition of the half-full output of FIFO memories 20, 22 is latched into latch circuits 36, 38 at the beginning of each sampling interval T by the strobe signal ST generated by timing signal generator 34. If the half-full output of FIFO memory 20 is at the binary "1" level at the beginning of a given sampling interval (indicating that FIFO memory 20 is requesting additional information), the output of latch 36 latches at the binary "1" level.

In this condition, latch circuit 36 enables AND gates 40, 42 causing them to pass read pulses RD1 and strobe pulses S1, respectively. The read pulses RD1 are applied to OR gate 44 whose output defines the read pulses R applied to the READ input of RAM array 14. The output of AND gate 42 defines the strobe signals SF1 applied to the STROBE IN input of FIFO memory 20. As a result, timing control circuit 16 causes a pair of sampled signals stored in RAM array 14 to be written into FIFO memory 20 during each sampling interval in which additional data has been requested by FIFO memory 20. In the event that the half-full output HF1 of FIFO memory 20 is at the binary "0" level at the beginning of the sampling interval, the output of latch circuit 36 will be latched at the binary "0" level disabling AND gates 40, 42. In such a case, no additional data will be read into FIFO memory 20 during that sampling interval. In a similar manner, the output of latch circuit 38 controls the operation of AND gates 46, 48 to insure that a pair of sample signals are written into FIFO memory 22 only when requested by FIFO memory 22.

Figure 4:
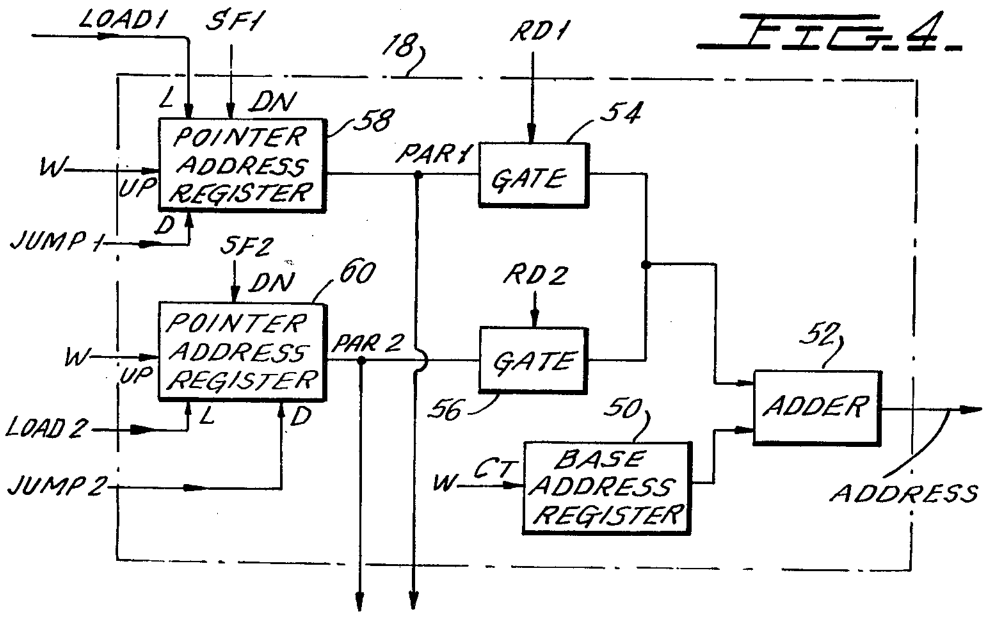
FIG. 4 is a block diagram of the address generator of FIG. 1.

Turning now to FIG. 4, the structure and operation of address generator 18 will be described. The heart of address generator 18 is a base address register 50 which determines the storage location of each successive sample signal generated by A/D converter 12. Base address register 50 is preferably a down counter whose output decreases by one each time a new write pulse W is applied to its count input CT. As a result, the base address decreases by one during each sampling interval T causing each successive sampled signal to be stored in a successively decreasing storage location of RAM array 14.

Figure 5:
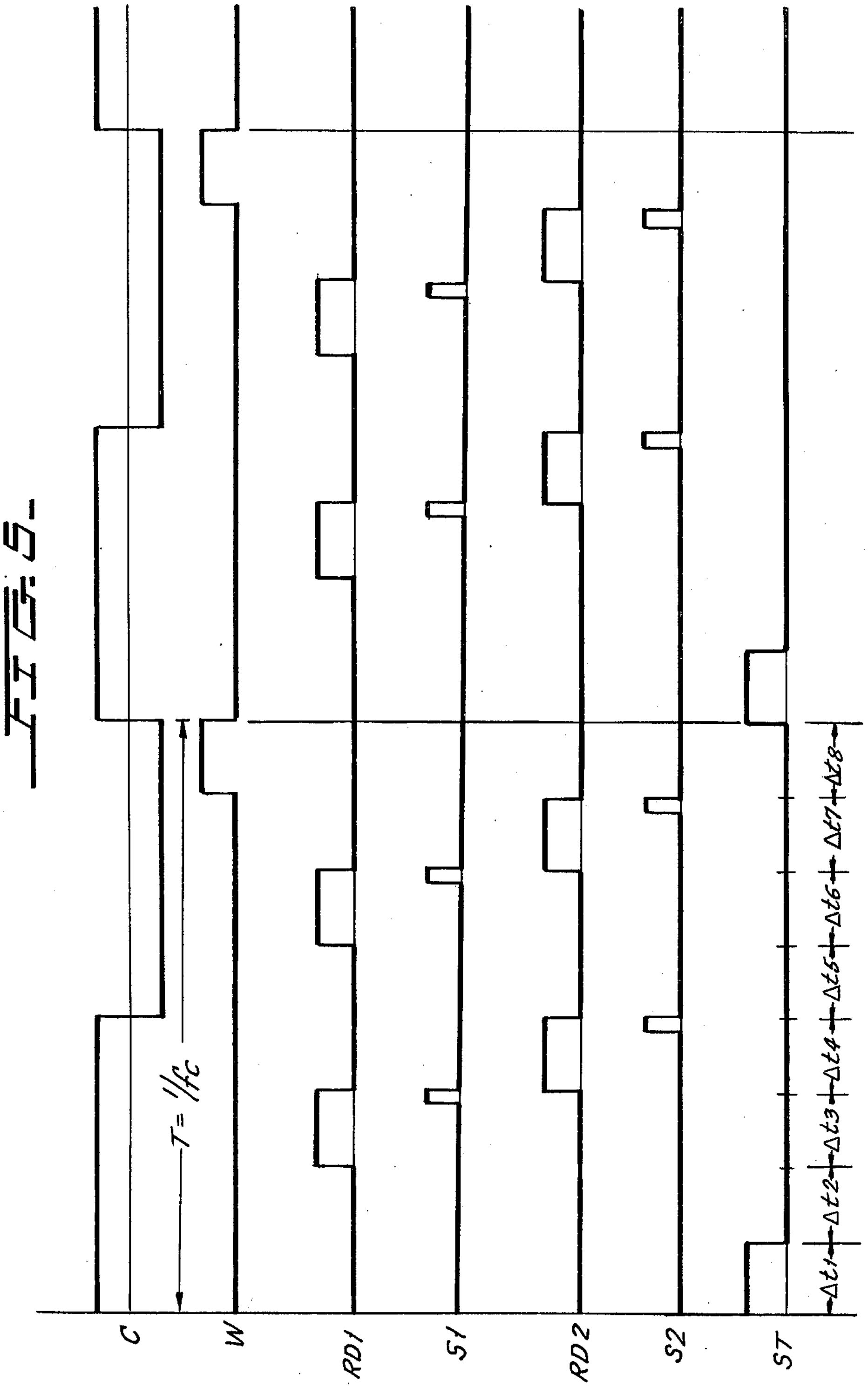
FIG. 5 is a timing diagram illustrating the timing of various signals appearing in the timing control circuit of FIG. 3.

The output of base address register 50 is applied to an adder 52 whose output is applied to the ADDRESS input of RAM array 14. The remaining input of adder 52 is coupled to the outputs of gates 54, 56 which are gated by read pulses RD1, RD2, respectively. As shown in FIG. 5, the read pulses RD1, RD2 are generated prior to the generation of the write pulse W. As a result, the output of adder 52 will be equal to the base address register whenever a write pulse W is applied to the WRITE input of RAM array 14. Accordingly, each successive sampled signal generated by A/D converter 12 will be written into RAM array 14 at the address location determined by base address register 50.

Figure 6:
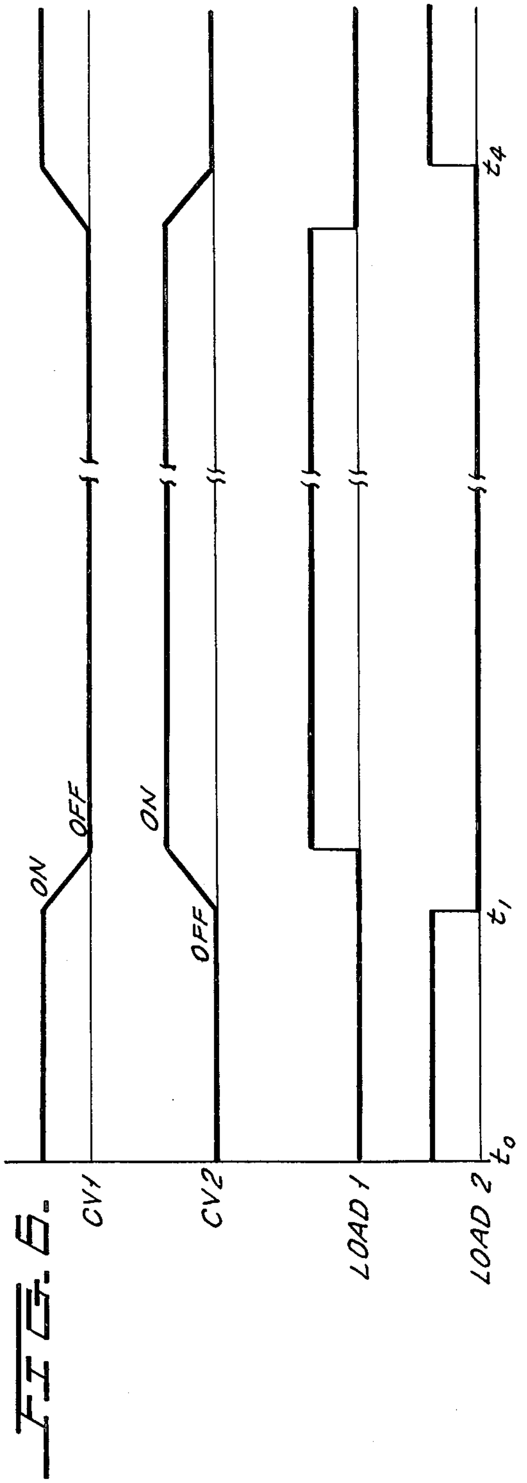
FIG. 6 is a timing diagram illustrating various signals generated by the splice control circuit of FIG. 1.

As noted above, address generator 18 must include means for determining the storage location in RAM array 14 corresponding to the last sampled signals applied to FIFO memories 20, 22. To this end, address generator 18 includes a pair of pointer registers 58, 60 which are associated with FIFO memories 20, 22, respectively. Each pointer register 58, 60 is preferably an up-down counter whose stored count (and, therefore, whose output) is increased by one each time it receives a write pulse W on its UP input and whose stored count (and, therefore, whose output) is decreased by one each time a strobe pulse SF1, SF2, respectively, is applied to its down input DN. Pointer address registers 58, 60 are preferably programmable counters which are loaded with a value determined by a JUMP signal applied to its data input D whenever a LOAD signal (a binary "1") is applied to its load input L. As shown in FIG. 6, the LOAD signal of the active FIFO memory 20, 22 is set at the binary "0" level, while that of the inactive memory is set at the binary "1" level. As a result, the pointer address register 58, 60 associated with the inactive FIFO register 20, 22 will constantly be loaded with its JUMP value. This value is generated by splice control circuit 32 in the manner described below.

As noted above, the strobe signals SF1, SF2 are generated in pairs. During those time intervals in which the FIFO memory 20 is active and requests additional data, timing control circuit 16 generates a pair of strobe signals SF1. Similarly, during those time intervals in which the FIFO memory 22 is active and requests additional data, timing control circuit 16 generates a pair of strobe signals SF2. During those time intervals in which FIFO memories 20, 22 do not request additional information, timing control circuit 16 does not generate any corresponding strobe pulses SF1, SF2. As a result, the net count (and, therefore, the pointer address signal PAR 1) in pointer address register 58 will increase by one during each sampling interval T in which additional information is not applied to FIFO memory 20 and FIFO memory 20 is active and will decrease by one during each sampling interval during which additional information is applied to FIFO memory 20 if FIFO memory 20 is active. Similarly, the net count in pointer address register 60 (and, therefore, the pointer address signal PAR 2) will increase by one during each sampling interval in which additional information is not applied to FIFO memory 22 and FIFO memory 22 is active and will decrease by one during each sampling interval during which additional information is applied to FIFO memory 22 and FIFO memory 22 is active. The importance of reading pairs of sampled signals into FIFO memories 20, 22 can now be explained.

Assuming that FIFO memory 20 does not request additional data during a given sampling interval T, the stored count in pointer address register 58 will increase by one. It would appear that this would result in an error since the storage location of the last sampled signal stored in FIFO memory 20 has not changed. It must be remembered, however, that the count in base address register 50 decreases by one during each successive sampling interval. As such, the count in pointer address register 58 must increase by one to insure that the address appearing at the output of adder 52 during the portion of the sampling interval corresponding to the generation of the read pulse RD1 will be the same in two consecutive sampling intervals. If the count in pointer address register 58 did not change during those sampling intervals in which no additional information is applied to FIFO memory 20, the address generated by adder 52 during that portion of the sampling interval corresponding to the generation of the read pulse RD1 would be one less than the address generated during the previous sampling interval which would produce an improper result.

Figure 7:
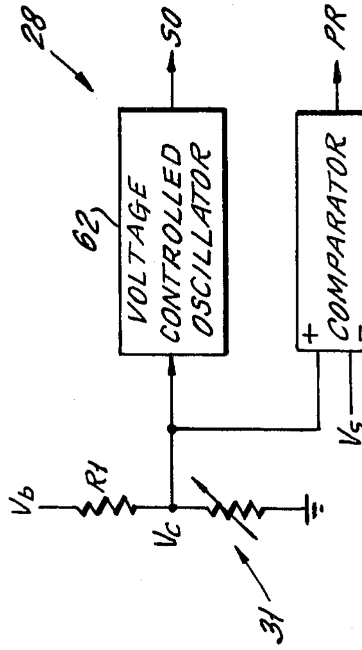
FIG. 7 is a block diagram of the read rate controller of FIG. 1.

Referring now to FIG. 7, the structure and operation of read rate controller 28 will be described. Read rate controller 28 includes a voltage controlled oscillator 16 which generates a pulse train SO whose frequency is determined by the magnitude of the voltage signal Vc applied to its input. This signal is determined by the voltage divider defined by resistor cap R1 and potentiometer 31 and will represent some fraction of the biasing voltage Vb. The magnitude of the voltage signal Vc and, therefore, the frequency of the pulse train SO is determined by the setting of potentiometer 31.

The voltage signal Vc is also applied to comparator 64 which compares it to a preset value Vs. The preset value Vs corresponds to the magnitude of the voltage signal Vc which will cause voltage controlled oscillator 62 to generate a pulse train SO whose frequency is equal to the sampling frequency fc of RAM array 14. Accordingly, the voltage Vc will be greater than the preset voltage Vs whenever pitch changer 10 is increasing the frequency of the AUDIO IN signal and will be less than the preset value Vs whenever pitch changer 10 is reducing the frequency of the AUDIO IN signal. Comparator 64 generates the pitch ratio signal PR at its output. The pitch ratio signal PR will be at the binary "1" level whenever pitch changer 10 is operating in the increased frequency mode (a pitch ratio of greater than 1) and will be at the binary "0" level whenever pitch changer 10 is operating in the decreased frequency mode (a pitch ratio of less than 1). The pitch ratio PR is applied to splice control circuit 32 and tells splice control circuit 32 whether to compare the delay in the active FIFO memory 20, 22 with a preset maximum or minimum value. The strobe pulses SO are applied to FIFO memory 20, 22 and determine the frequency at which sample signals are read into the active FIFO memory 20, 22 and, therefore, determines the relative pitch of the AUDIO OUT signal.

Referring to FIG. 8, the pitch ratio signal PR is applied to the ramp signal generator 66 of the splice control circuit 32. Ram signal generator 66 also receives the load signals LOAD 1, LOAD 2, generated by load signal generator 68. As noted above, the load signal LOAD 1, LOAD 2 associated with the active FIFO memory 20, 22 is at the binary "0" level while that associated with the inactive memory will be at the binary "1". During a splice interval, both FIFO memories 20, 22 will be active and, therefore, both load signals LOAD 1, LOAD 2 will be at the binary "0" level. Accordingly, the condition of these input signals informs ramp signal generator 66 whether a splicing interval is occurring and, if not, which of the two FIFO memories, 20, 22 is presently active.

Ramp signal generator 66 also receives the pointer address signals PAR1, PAR2 generated by address generator 18. These signals inform ramp signal generator 66 of the delay of the active FIFO memory 20, 22. Ramp signal generator 66 continually monitors all of these signals and generates the control signals CV1, CV2 in the manner illustrated with respect to FIG. 6, supra.

Figure 9:
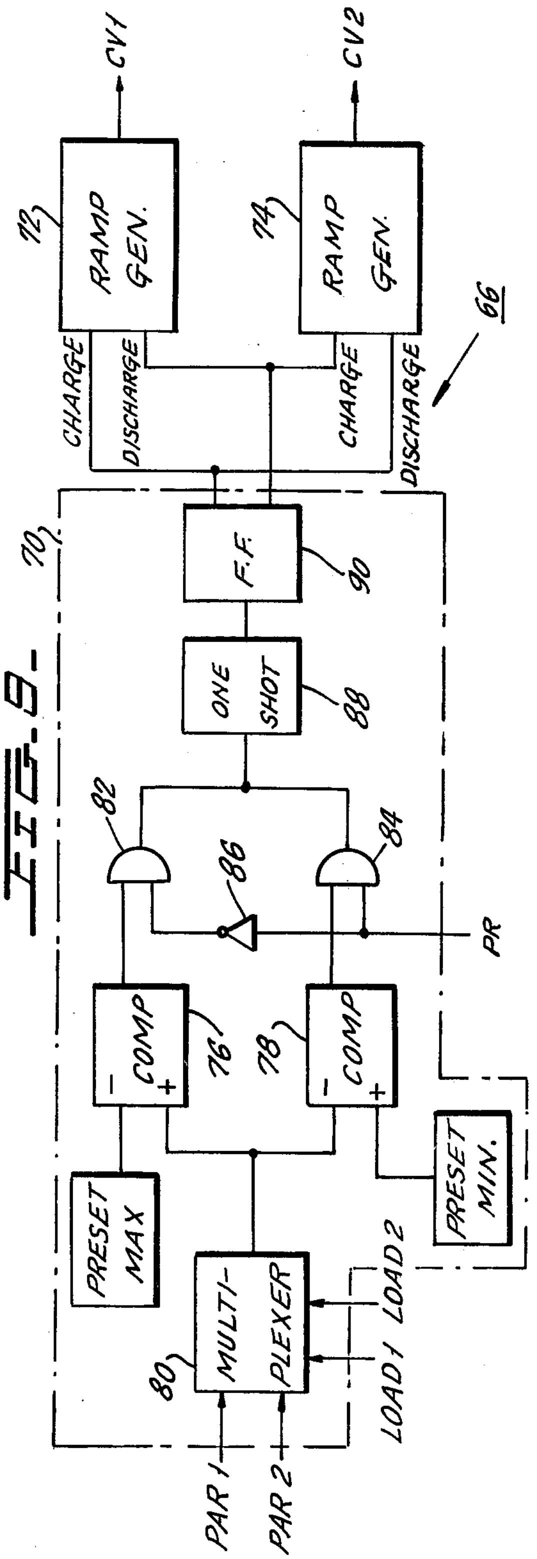
FIG. 9 is a block diagram of the ramp signal generator of FIG. 8.

The particular structure and operation of ramp signal generator 66 will now be described with reference to FIG. 9. Ramp signal generator 66 includes a logic circuit 70 and a pair of ramp generators 72, 74. Logic circuit 70 monitors the condition of input signals PAR1, PAR2, LOAD 1, LOAD 2 and PR and controls the operation of ramp generators 72, 74 as a function thereof. Ramp generator 72 generates the control signal CV1 and causes this signal to vary between the predetermined maximum and minimum levels corresponding to the ON and OFF levels of FIG. 6. Whenever a binary "1" is applied to the CHARGE input of ramp generator 72, the control signal CV1 will charge in a ramp-like fashion from a predetermined minimum level (e.g. 0 volts) to a predetermined maximum level. Whenever a binary "1" is applied to the DISCHARGE of ramp generator 72, the control signal CV1 will ramp from the predetermined maximum to the predetermined minimum level. Ramp generator 74 operates in a similar manner. The CHARGE input of ramp generator 72 is coupled to the DISCHARGE input of ramp generator 74 while the DISCHARGE input of ramp generator 72 coupled to the CHARGE input of ramp generator 74. As such, whenever ramp generator 72 is charging, ramp generator 74 will be discharging and vice versa. The charging and discharging sequences of ramp generators 72, 74 is controlled by the outputs of logic circuit 70.

Logic circuit 70 continually compares the delay in the active FIFO memory 20, 22 to either a preset maximum value (for its ratios less than "1") or a preset minimum value (for its ratios greater than "1") and initiates a ramping operation whenever the delay in the active FIFO memory reaches the preset value. The heart of logic circuit 70 is a pair of comparators 76, 78 whose non-inverting and inverting inputs are coupled to the output of multiplexer 80, respectively. Multiplexer 80 receives the two pointer address signals PAR1, PAR2 as input signals and applies one of these signals to its output depending upon the conditions of load signals LOAD 1, LOAD 2. When load signal LOAD 1 is at the binary "1" level (indicating that FIFO memory 22 is the active memory), multiplexer 80 applies the pointer value PAR2 to comparators 76, 78. Conversely, when load signal LOAD 2 is at the binary "1" level (indicating that FIFO memory 20 is the active memory) multiplexer 80 applies the pointer value PAR1 (indicative of the delay in FIFO memory 20) to comparators 76,78.

Comparator 76 compares the pointer value of the active FIFO memory 20, 22 with a predetermined maximum value which is preferredly equal to three-quarters of the maximum delay of RAM array 14 (e.g., 18.75 milliseconds). Whenever the delay in the active FIFO memory 20, 22 exceeds this preset maximum value, comparators 76 will generate a binary "1" on its output. At all other times, comparator 76 will generate a binary "0" on its output. While the preset maximum value is preferably 18.75 milliseconds, other values may be used. Additionally, the value may be adjustable as desired.

Comparator 78 compares the value of the pointer address associated with the active FIFO memory 22 with a preset minimum value and generates a binary "1" on its output whenever the delay in the active FIFO memory 20, 22 is less than the minimum value. In a preferred embodiment, the preset minimum value is one-quarter of the maximum delay of RAM array 14 or 6.25 milliseconds. Other values may be used. The preset minimum value may also be adjustable as desired. Whenever the delay in the active FIFO memory 20, 22 is greater than the preset minimum value, comparator 78 generates a binary "0" on its output.

The output of comparators 76 and 78 are applied to AND gates 82, 84, respectively. The remaining input of AND gate 82 receives the output of inverter 86 which inverts the binary level of the pitch ratio signal PR. The remaining input of AND gate 84 is connected directly to the pitch ratio signal ER. As such, AND gate 82 will apply the output of comparator 76 to one shot 88 whenever the pitch ratio signal PR is at the binary "0" level (indicating a pitch ratio of less than "1") and STOP gate 84 will apply the output of comparator 78 to one shot 88 whenever the pitch ratio signal PR is at the binary "1" level (indicating a pitch ratio of greater than 1). As a result, logic circuit 70 effectively compares the delay in the active FIFO memory 20, 22 to the preset maximum value whenever pitch changer 10 is decreasing the pitch of the AUDIO IN signal and compares the delay in the active FIFO memory 20, 22 to the preset minimum value whenever pitch changer 10 is increasing the pitch of the AUDIO IN signal.

The output of AND gates 82, 84 are applied to one shot 88 which generates a single pulse on its output whenever the outputs of either AND gate 82, 84 switch from the binary "0" to the binary "1" level. The output of one shot 88 is applied to a flip-flop 90 whose output toggles in response thereto. As such, flip-flop 90 will cause the outputs of ramp generators 72, 74 to initiate a splice operation whenever logic circuit 70 determines that the delay in the active FIFO memory 20, 22 has reached the preset maximum or minimum levels for decreasing and increasing pitch changes, respectively.

Figure 10:
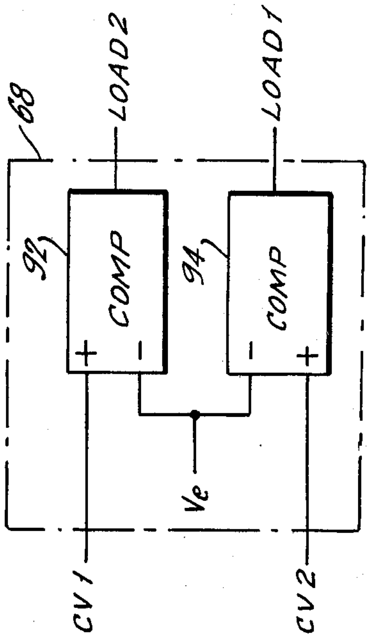
FIG. 10 is a block diagram of the load signal generator of FIG. 8.

As shown in FIG. 8, the control signals CV1, CV2 generated by ramp signal generator 66 are applied to load signal generator 68 as well as to multiplying D/A converters 24, 26 FIG. 1. The structure of load signal generator 68 is illustrated in FIG. 10. As shown therein, load signal generator 68 includes a pair of comparators 92, 94 which compare the level of the control signals CV1, CV2, respectively, to a voltage signal Ve corresponding to the maximum value of the control signals CV1, CV2. As such, the output of comparator 92, which output defines the load signal LOAD 2, will be at the binary "1" level whenever the control signal CV1 is at its maximum value and will be at the binary "0" level at all other times. Similarly, the output of comparator 94, which output defines the load signal LOAD 1, will be at the binary "1" level whenever the control signal CV2 is at its maximum level and will be at the binary "0" level at all other times. As a result, the load signal LOAD 1 will be at the binary "1" level whenever FIFO memory 22 is in the active state, load signal LOAD 2 will be at the binary "1" level whenever FIFO memory 20 is in the active state and both load signals LOAD 1, LOAD 2 will be at the binary "0" level during the splicing interval.

In addition to generating the load signals LOAD 1, LOAD 2 and the control signals CV1, CV2, splice control circuit 32 generates the jump signals JUMP 1 and JUMP 2 which indicate the specific time differential between the signal segments stored in the two FIFO memories 20, 22 which will produce the least amount of cancellation during the splicing interval. To this end, splice control circuit 32 includes an auto correlation signal generating circuit 98 which periodically generates a new auto correlation signal ASPV indicative of the desired time shift between the two signal segments stored in FIFO memories 20, 22 (and, therefore, the desired splice point for these segments) and applies this signal to a jump signal generator 96 which generates jump signals JUMP 1, JUMP 2 accordingly. Since the auto correlation signal ASPV provides an indication of the preferred time displacement between the two signals stored in FIFO memories 20, 22, but does not provide an indication of the actual location of these signals in RAM array 14, jump signal generator 96 adds (for increasing pitch) or subtracts (for decreasing pitch) the auto correlation signal ASPV to the pointer address signals PAR 1, PAR 2 of the active FIFO memory so as to generate the appropriate jump signal to be applied to the inactive FIFO memory 20, 22.

Figure 11:
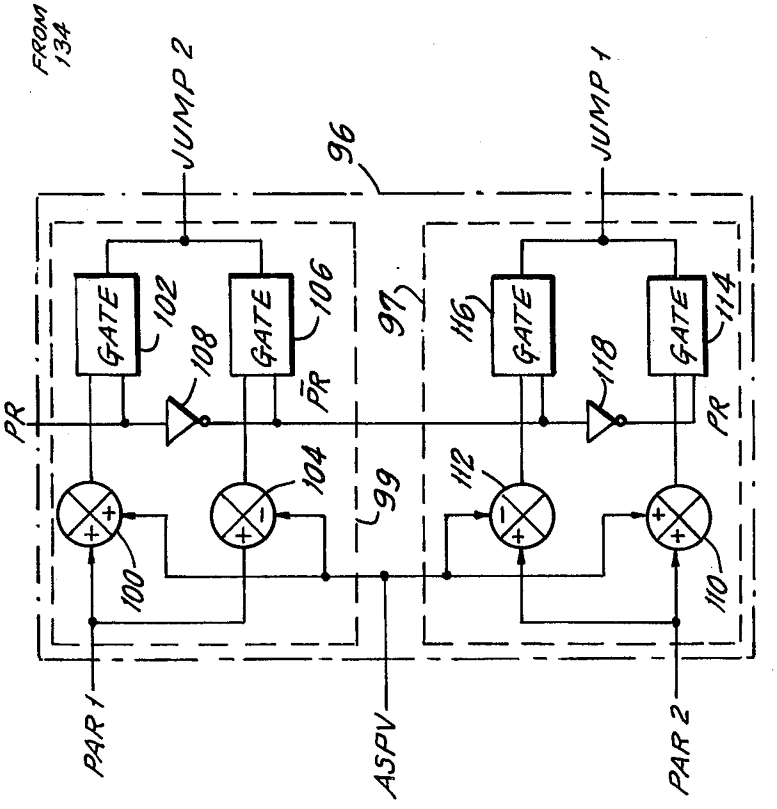
FIG. 11 is a block diagram of the jump signal generator of FIG. 8.
Figure 6:
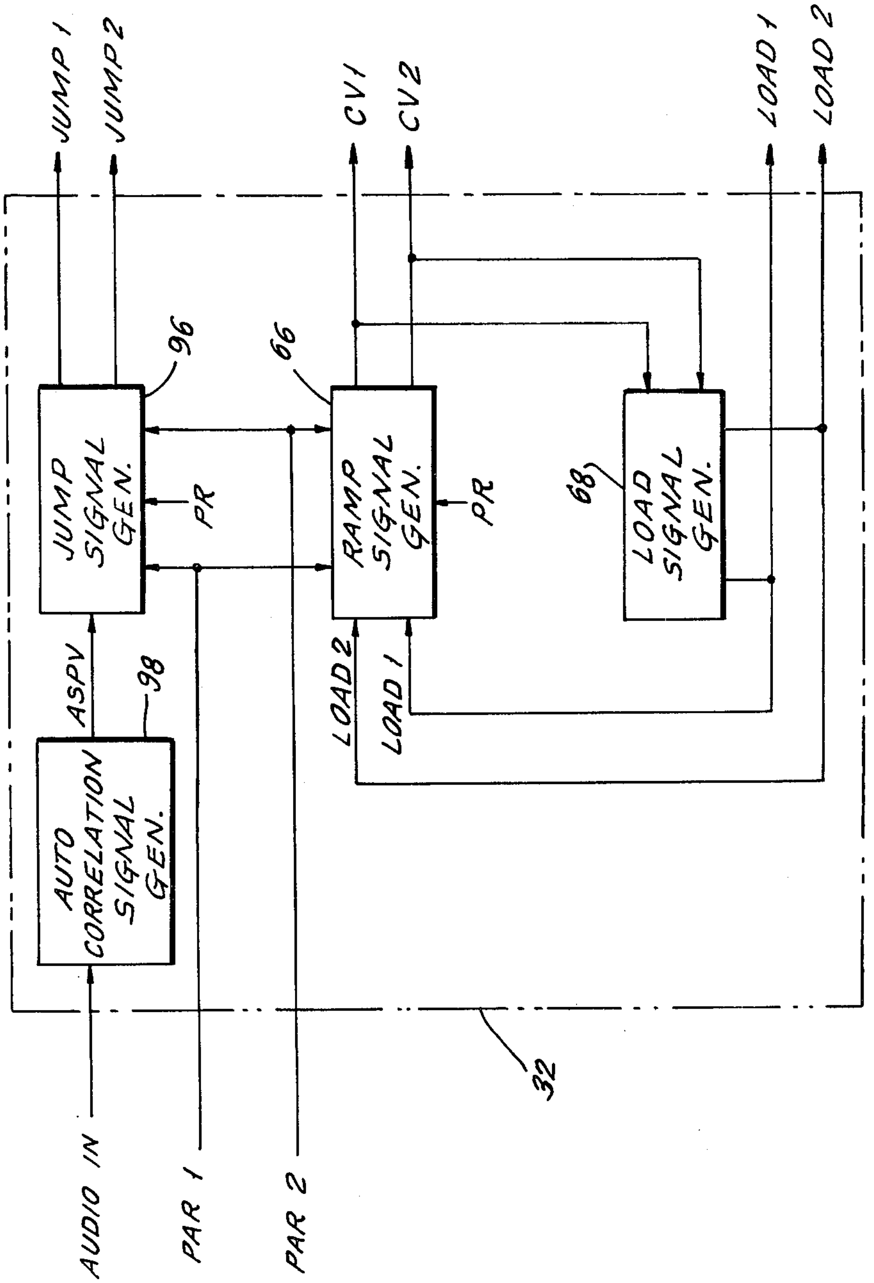

The jump signals JUMP 1, JUMP 2 are generated by jump signal generator 96 whose structure is illustrated in FIG. 11. The jump signal generator 96 includes a pair of logic circuits 97, 99 which generate the respective jump signals JUMP 1, JUMP 2. Logic circuit 99 receives the pointer address signal PAR 1 and the auto correlation signal ASPV and generates the jump signal JUMP 2 as a function thereof. The two signals PAR 1 and ASPV are respectively added and subtracted in adders 100, 104. The output of adder 100 is applied to gate circuit 102 which is gated by the pitch ratio signal PR. The output of subtractor 104 is applied to gate circuit 106 which is gated by the inverted pitch ratio signal $\overline{PR}$ appearing at the output of inverter 108. As a result, the output of adder 100 is applied to the output of logic circuit 99 when the pitch ratio signal PR is at the binary "1" level (indicating that pitch changer 10 is operating in an increased pitch mode) and the output of adder 104 will be applied to the output of logic circuit 99 when the pitch ratio signal PR is at the binary "0" level (indicating that pitch changer 10 is operating in the decreased frequency mode). The output of logic circuit 99 defines the jump signal JUMP 2. As such, the jump signal JUMP 2 will be equal to the sum of the pointer address signal PAR 1 and the auto correlation signal ASPV when pitch changer 10 is operating in the increased pitch mode and will be equal to the difference between these signals when pitch changer 10 is operating in the decreased frequency mode.

The logic circuit 97 receives the pointer address signal PAR 2 and the auto correlation signal ASPV and generates the jump signal JUMP 1 as a function thereof. The two signals PAR 2 and ASPV are respectively added and subtracted in adders 110, 112. The output of adder 110 is applied to gate circuit 114 which is gated by the pitch ratio signal PR appearing at the output of inverter 118. The output of adder 112 is applied to gate circuit 116 which is gated by the inverted pitch ratio signal $\overline{PR}$ appearing at the output of inverter 108. As a result, the output of adder 110 is applied to the output of logic circuit 97 when the pitch ratio signal PR is at the binary "1" level (indicating that pitch changer 10 is operating in the increased frequency mode) and the output of adder 112 is applied to the output of logic circuit 97 when the pitch ratio signal PR is at the binary "0" level (indicating that pitch changer 10 is operating in the decreased frequency mode). Since the output of logic circuit 97 defines the jump signal JUMP 1, the jump signal will be equal to the sum of the two signals PAR 2 and ASPV for increasing pitch ratios and will be equal to the difference between the signals for decreasing pitch ratios.

As noted above, the auto correlation signal ASPV applied to jump signal generator 96 is generated by auto correlation signal generator 98. Auto correlation signal generator 98 compares a first signal segment (preferably, but not necessarily, 6.25 milliseconds long) to a second successive signal segment (preferably, but not necessarily, 12.5 milliseconds long) of the AUDIO IN signal and determines how far the first signal segment should be phase shifted (time delayed) with respect to the second signal segment in order to have the greatest degree of similarity between the first signal segment and an equal size piece (e.g. 6.25 milliseconds) of the second signal segment. This computation is performed periodically (e.g. once every 6.25 milliseconds) such that autocorrelation signal generator 98 generates a new autocorrelation signal ASPV once every autocorrelation computation interval. Since this signal indicates the preferred time delay between the first and second signal segments which will cause the two signal segments to be most similar, it can be used by the splice control circuit 32 to adjust the time delay between the signal segments stored in FIFO memories 20, 22 to insure minimum cancellation of the signals in mixer 30 during the splicing interval.

Figure 12:
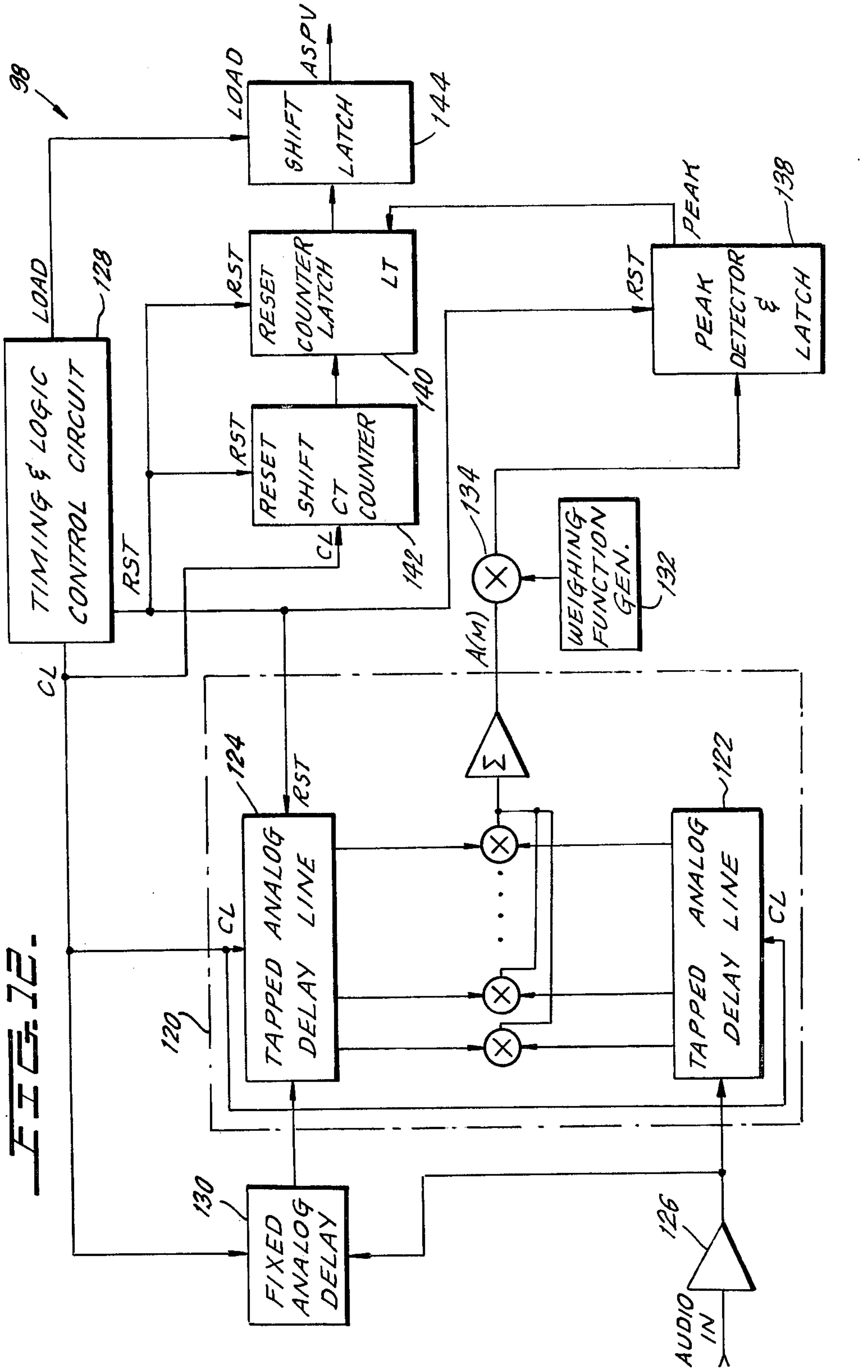
FIG. 12 is a block diagram of the auto correlation signal generator of FIG. 8.

The structure of autocorrelation signal generator 98 is illustrated in FIG. 12. The heart of autocorrelation signal generator 98 is an autocorrelation circuit 120 which performs an autocorrelation function comparing the two signal segments stored in tapped analog delay lines 120, 122. To this end, autocorrelation circuit 120 compares two sample segments stored in tapped analog and delay lines 122, 124 and generates an autocorrelation coefficient A(m) in accordance with the following equation:

$$A(m) = \frac{1}{N} \sum_{M=0}^{N-1} x(n)\, x(m+n)$$

wherein N is the number of storage locations in the delay lines 122, 124, x(n) is the signal segment stored in tapped analog delay lines 122 and x(m+n) is the sample segment stored in tapped analog delay 124. In the preferred embodiment, each tapped analog delay line 122, 124 includes 256 storage locations which, as will be shown below, correspond to a 6.25 millisecond segment of the AUDIO IN signal. Such a circuit can be formed utilizing eight cascaded Reticon R5483 analog/analog correlator convolvers.

As described below, the analog signals stored in the two delay lines 122, 124 are initially offset with respect to one another by 256 sampling intervals (e.g. 6.25 milliseconds) at the beginning of each autocorrelation computation interval and are offset with respect to one another by 512 sampling intervals (or 12.5 milliseconds) at the end of the autocorrelation computation interval. Accordingly, the autocorrelation value A(m) appearing at the output of autocorrelation circuit 120 will vary during the autocorrelation computation interval in accordance with the similarity between two sample segments of the AUDIO IN signal which are time displaced from one another by from 256 to 512 sampling intervals (6.25–12.5 milliseconds). The autocorrelation value A(m) will reach a peak level at the particular delay in which the two signal segments are most similar. The particular delay at which the autocorrelation value A(m) is at the maximum value is memorized by autocorrelation signal generator 98 and is generated as the autocorrelation signal ASPV during the next autocorrelation computation interval.

In order to effectuate the desired initial delay between the signal segments stored in tapped analog delay line 122, 124, the AUDIO IN signal is passed through a fixed analog delay circuit 130 before being applied to tapped analog delay line 124 which causes the signal applied to delay line 124 to be offset with respect to that applied to delay line 122 by 6.25 milliseconds.

Figure 13:
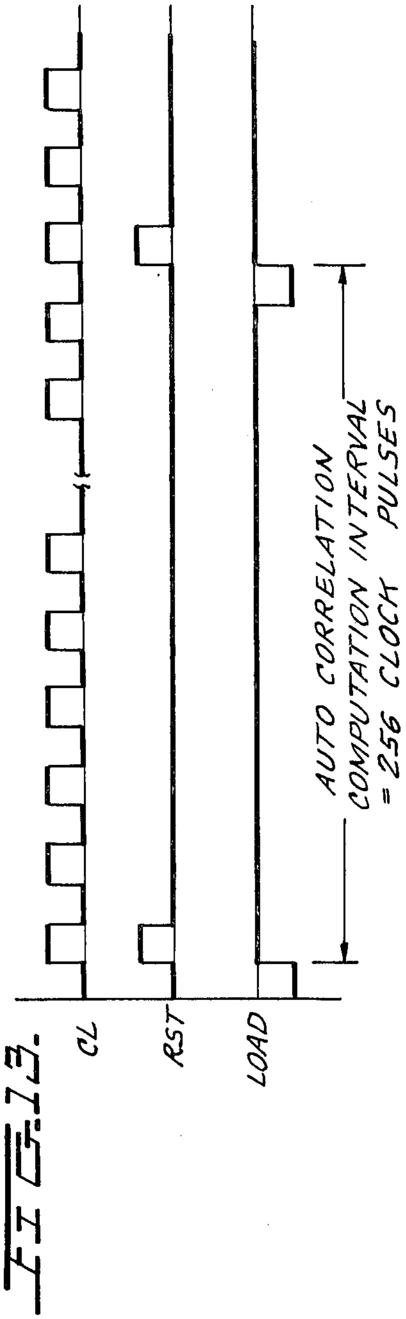
FIG. 13 is a timing diagram illustrating various signals appearing in the auto correlation signal generator of FIG. 12.

Before being applied to either delay line 122, 124, te AUDIO IN signal is applied to a log amplifier 126 which serves to compress the AUDIO IN signal and thereby increases the dynamic range of the system. The compressed AUDIO IN signal is read into tapped analog delay line 122 at a frequency determined by clock pulses CL generated by timing and logic control circuit 128. These pulses are illustrated in FIG. 13. As shown therein, the clock pulses CL are continuous pulse train having a frequency which is preferably equal to the sampling frequency fc of RAM array 14.

Tapped analog delay line 122 is a charge transfer device which samples the instantaneous value of the compressed AUDIO IN signal each time a new clock pulse CL is applied thereto and stores the sample signal in analog form in the first storage location of the analog delay line 122. Simultaneously, each analog sample already stored in delay line 122 is shifted one position to the right. As a result, tapped analog delay line 122 will, at any give instant, store 256 samples of the compressed AUDIO IN signal corresponding to a 6.25 millisecond segment thereof. Since the compressed AUDIO IN signal is continually stepped through tapped analog delay line 122, the particular signal segment stored in tapped analog delay line 122 is continually changing at the clock rate. As a result, a 12.5 millisecond segment of the AUDIO in signal is stepped through tapped analog delay line 122 during each 6.25 millisecond correlation coefficient computation interval.

Before the compressed AUDIO IN signal is applied to tapped analog delay line 124, it is first delayed in fixed analog delay circuit 130. Fixed analog delay circuit 130 is preferably a charged transfer device which samples the compressed AUDIO signal at a sampling rate determined by the clock signal CL and shifts each successive sample through successive storage locations of the delay line. In a preferred embodiment, fixed analog delay circuit 130 includes 256 storage locations such that the output signal applied to tapped analog delay line 124 is identical to the compressed AUDIO IN signal but delayed with respect thereto by 6.25 milliseconds. One suitable analog delay is sold under the trademark SAD 1024. The output of fixed analog delay circuit 130 is clocked through tapped analog delay line 124 at the clock rate CL. Tapped analog delay line 124 includes both an analog delay line and a latch circuit which is responsive to a reset signal RST generated by timing and logic control circuit 128. Each time the reset signal RST is applied to tapped analog delay line 124, its internal latch latches the information presently located in its delay line and applies this signal to the output of tapped analog delay line 124 until the next reset signal RST is applied thereto.

As shown in FIG. 13, a new reset signal RST is generated at the beginning of each successive autocorrelation computation interval. Accordingly, an analog signal corresponding to a 6.25 millisecond of the compressed AUDIO IN signal appears at the output of tapped analog delay line 124 during each autocorrelation computation interval. This signal is constantly compared to the signal segment stored in tapped analog delay line 122 during the autocorrelation computation interval. During this interval, a 12.5 millisecond segment of the compressed AUDIO IN signal is shifted through the tapped analog delay line 122. Due to the delay induced by fixed analog delay 130, the signal segment stored in tapped analog delay line 124 will be shifted with respect to the signal stored in delay line 122 by 256 sampling intervals, or 6.25 milliseconds, at the beginning of the autocorrelation computation interval. Since new samples of the compressed AUDIO IN signal are constantly applied to tapped analog delay line 122, the delay between the sampled signal located in tapped analog delay line 124 and that located in tapped analog delay line 122 will increase during the autocorrelation computation interval to a maximum of 512 sampling intervals, or 12.5 milliseconds, at the end of the autocorrelation computation interval. As such, autocorrelation circuit 120 generates autocorrelation coefficients A(m) for delays of from 6.25 to 12.5 milliseconds. Partiticularly, the new autocorrelation coefficient A(m)

is generated for each new clock pulse CL such that 256 autocorrelation coefficients A(m) are generated during each 6.25 millisecond autocorrelation computation interval. This process is repeated over 6.25 milliseconds.

The remainder of autocorrelation signal generator 98 monitors the magnitude of the autocorrelation coefficient A(m) during the autocorrelation computation interval and determines the delay between the signal segment stored in delay line 124 and the signal segment passing through delay line 122 which will result in the highest autocorrelation coefficient and generates the autocorrelation signal ASPV as a function thereof. For periodic signals, it is quite possible that the autocorrelation coefficient A(m) will reach the same peak value several times during a single autocorrelation computation interval. Since larger delays are preferable to shorter delays (larger delays will result in fewer splicing intervals), the present invention preferably employs a weighing function generator 132 which multiplies the autocorrelation coefficient A(m) by a weighing function which increases with time. For example, the weighing function might be at the level 0.9 at the beginning of each autocorrelation computation interval and might increase linearly to the level 1.0 at the end of each autocorrelation interval. As such, the weighing function generator 132 can be reset by the reset pulse RST as desired. By way of simple example, the weighing function generator 132 may include an RC circuit which is initially charged to a level corresponding to 0.9 at the beginning of each autocorrelation computation interval and which charges to a level corresponding to 1.0 by the end of each autocorrelation interval. While it is preferred that a weighing function generator is utilized, it can be omitted if desired. When the weighing function generator 132 is used, the autocorrelation coefficient A(m) is continuously multiplied by the output of the weighing function generator 132 in multiplier 134.

The output of multiplier 134 is applied to peak detector and latch circuit 138 which monitors the level of the multiplier output and generates a PEAK pulse each time this output reaches a new peak level during a given autocorrelation computation interval. The structure and operation of this circuit is described in greater detail below with reference to FIG. 14.

The PEAK pulse generated by digital peak detector and latch circuit 138 is applied to the latch input LT of counter latch 140. Each time a new PEAK pulse is applied to counter latch 140, counter latch 140 will latch its output at the instantaneous count of shift counter 142. Shift counter 142 is a standard digital counter whose stored count increases by one each time a new clock pulse CL is applied to its count input CT. The counter shift counter 142 is reset to zero by reset signal RST at the beginning of each autocorrelation computation interval. The count in shift counter 142 increases from zero to a maximum level of 256 during the autocorrelation computation interval at a frequency determined by the clock pulses CL. Whenever peak detector and latch circuit 138 detects a new peak value of the autocorrelation coefficient A(m) (as modified by the weighing function generator), counter latch 140 will latch its output to the instantaneous count in shift counter 142. As such, the output of counter latch 140 will always be a number indicative of the delay between the two sample segments compared by autocorrelation circuit 120 which will result in the highest autocorrelation coefficient A(m).

The count appearing at the output of counter latch 140 will change several times during the autocorrelation computation interval as new peak levels of the autocorrelation coefficients A(m) occur. At the end of autocorrelation computation interval timing and logic control circuit 128 generates a LOAD Pulse (See FIG. 13) which is applied to shift latch 144 causing the output of latch 144 to latch the count appearing at the output of counter latch 140 at the end of the last autocorrelation computation interval and to generate this count as the autocorrelation signal ASPV during the entire next successive autocorrelation computation interval. Since the count appearing at the output of latch 140 at the end of the prior autocorrelation computation interval indicates the delay between the two signal segments compared by autocorrelation circuit 120 which will result in the highest autocorrelation coefficient A(m), the output of shift latch 144 (which output defines the autocorrelation signal ASPV) provides an indication of the preferred delay between the two sample segments stored in FIFO memories 20, 22 which will result in the least amount of cancellation in mixer 30 during a splicing interval.

Figure 14:
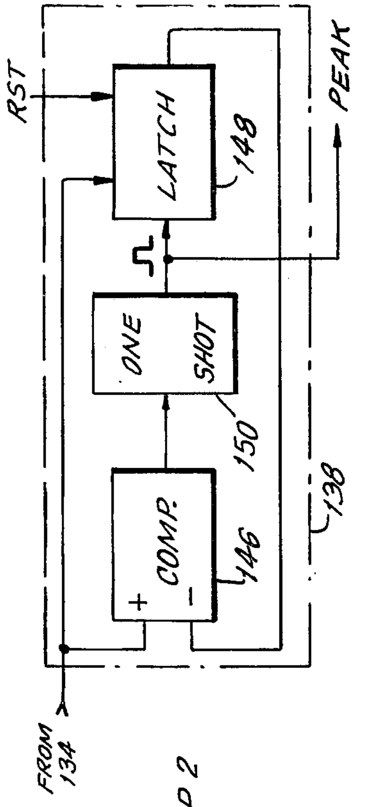
FIG. 14 is a block diagram of the peak detector and latch circuit of FIG. 8.

The structure of digital peak detector and latch circuit 138 is illustrated in FIG. 14. As shown therein, peak detector and latch circuit 138 includes a comparator 146 which compares the output of multiplier 134 with the value stored in latch 148. At the beginning of each autocorrelation computation interval latch 148 is reset to zero by the reset signal RST. Accordingly, the first autocorrelation coefficient A(m) generated by autocorrelation circuit 120 during the autocorrelation computation interval will cause the output of comparator 146 to jump to the binary "1" level. As a result, one shot 150 generates a single pulse at its output which is applied to latch 148 and causes latch 148 to latch the first autocorrelation coefficient A(m) (as modified by weighing function generator 132) in latch 148. As a result, the two signals compared by comparator 148 will be equal and the output of comparator 148 will return to the binary "0" level.

When the next autocorrelation coefficient A(m) is generated by autocorrelation coefficient circuit 120, this coefficient will be compared to the stored coefficient in latch 148 by comparator 146. If the new autocorrelation coefficient A(m) (as modified by weighting function generator 132) is less than the coefficient stored in latch 148, comparator 146 will remain at the binary "0" level, and the coefficient stored in latch 148 will remain the same. If the second autocorrelation coefficient A(m) is greater than that stored in latch 148, the output of comparator 146 will switch to the binary "1" level causing one shot 150 to generate an output pulse which causes the new autocorrelation coefficient to be latched in latch 148 and causes the generation of a new PEAK pulse. This process is repeated throughout the autocorrelation interval such that a new PEAK pulse is generated each time a successive autocorrelation coefficient A(m) (as modified by the weighing function generator 132) reaches a new peak value.

The present invention may be embodied in other specific forms without departing from the spirit or essential attributes thereof and, accordingly, reference should be made to the appended claims, rather than to the foregoing specification as indicating the scope of the invention.

What is claimed is:

1. A process of splicing together first and second signal segments of the same input signal, said second signal segment being longer than said first signal segment, said process comprising the steps of:

(A) comparing said first signal segment with a plurality of different subsegments of said second signal segment, each of said subsegments being equal in length to the length of said first signal segment and corresponding to a different splice point;

(B) generating a respective auto correlation coefficient as a function of each of said comparisons, each of said auto correlation coefficients being representative of the similarity between said first signal segment and a respective subsegment of said second signal segment;

(C) determining the most desirable splice point as a function of said auto correlation coefficients; and (D) splicing said signal segments together at that splice point determined to be the most desirable.

2. The process of claim 1, wherein said determining step comprises the step of determining which of said autocorrelation coefficients is the largest.

3. The process of claim 1, wherein said determining step comprises the steps of weighing each autocorrelation coefficient by a respective amount and determining which of said weighted autocorrelation coefficients is the largest.

4. The process of claims 1, 2 or 3, wherein said second signal segment is twice as long as said first signal segment.

5. The process of claim 1, wherein said splicing step comprises the step of combining portions of said first and second signal segments in a mixer during a splicing interval.

6. The process of claim 5, wherein only one of said first and second signal segments is applied to said mixer prior to the start of said splicing interval, both of said signal segments are applied to said mixer during said splicing interval, and only the remaining of said first and second signal segments is applied to said mixer after the end of said splicing interval.

7. The process of claim 6, wherein said first and second signal segments are multiplied by respective control signals during said splicing interval before they are combined in said mixer.

8. The process of claim 7, wherein:

that control signal which multiplies said one of said first and second signal segments is at a maximum level at the beginning of said splicing interval and gradually decreases to a minimum level by the end of said splicing interval; and that control signal which multiplies said remaining signal segment is at a minimum level at the beginning of said splicing interval and gradually increases to a maximum level by the end of said splicing interval.

9. The process of claims 1, 2, 3 or 8, wherein said first and second signal segments are contiguous segments of said input signal.

10. A process for changing the pitch of an input signal, comprising the steps of:

(A) sampling said input signal at a sampling rate fc and generating a respective digital signal representative of each successive sample;

(B) storing said digital signals in a memory;

(C) removing said digital signals from said memory at a frequency fp which is different than said sampling rate fc and generating a first analog signal as a function thereof, said first analog signal having a shape substantially identical to said input signal but being frequency shifted and time delayed with respect thereto;

(D) removing said digital signals from said memory means at said frequency fp and generating a second analog signal as a function thereof, said second analog signal being substantially identical in shape to said input signal but being frequency shifted and time delayed with respect thereto, said second analog signal having the same frequency as said first analog signal but being time delayed with respect thereto;

(E) normally applying only one of said first and second analog signals to a speaker so as to generate a pitch changed audio output signal, said analog signal which is applied to said speaker being an active analog signal, said analog signal which is not being applied to said speaker being an inactive analog signal; and (F) splicing the inactive analog signal to the active analog signal whenever the time delay of said active analog signal reaches predetermined limits, said splicing step comprising the steps of:

(1) comparing said first signal segment with a plurality of different subsegments of said second signal segment, each of said subsegments being equal in length to the length of said first signal segment and corresponding to a different splice point;

(2) generating a respective auto correlation coefficient as a function of each of said comparisons, each of said auto correlation coefficients being representative of the similarity between said first signal segment and a respective subsegment of said second signal segment;

(3) determining the most desirable splice point as a function of said auto correlation coefficients; and (4) splicing said signal segments together at that splice point determined to be the most desirable.

11. The process of claim 10, wherein said determining step comprises the step of determining which of said autocorrelation coefficients is the largest.

12. The process of claim 10, wherein said determining step comprises the step of weighing each autocorrelation coefficient by a respective amount and determining which of said weighted autocorrelation coefficients is the largest.

13. The process of claims 10, 11 or 12, wherein said second signal segment is twice as long as said first signal segment.

14. The process of claim 10, wherein said splicing step comprises the step of combining portions of said first and second analog signals in a mixer during a splicing interval.

15. The process of claim 14, wherein only one of said first and second analog signals is applied to said mixer prior to the start of said splicing interval, both of said first and second analog signals are applied to said mixer during said splicing interval, and only the remaining of said first and second analog signals is applied to said mixer after the end of said splicing interval.

16. The process of claim 15, wherein said first and second analog signals are multiplied by respective control signals during said splicing interval before they are combined in said mixer.

17. The process of claim 16, wherein:

that control signal which multiplies said one of said first and second analog signals is at a maximum level at the beginning of said splicing interval and gradually decreases to a minimum level by the end of said splicing interval; and that control signal which multiplies said remaining analog signal is at a minimum level at the beginning at said splicing interval and gradually increases to a maximum level by the end of said splicing interval.

* * * * *